United States Patent [19]

Takishita et al.

[11] 4,407,354
[45] Oct. 4, 1983

[54] VEHICLE TEMPERATURE CONTROL APPARATUS

[75] Inventors: Takashi Takishita; Shinji Sutoh; Noriyuki Tanaka; Takashi Kobayashi; Kenji Furukawa, all of Konan, Japan

[73] Assignee: Diesel Kiki Company, Ltd., Tokyo, Japan

[21] Appl. No.: 148,843

[22] Filed: May 12, 1980

[30] Foreign Application Priority Data

May 18, 1979 [JP] Japan .............................. 54-67117[U]

[51] Int. Cl.³ .......................... B60H 3/06; B60H 1/00
[52] U.S. Cl. ...................................... 165/42; 98/2.06; 98/2.11; 237/12.3 A
[58] Field of Search .......................... 165/42, 43, 119; 237/12.3 A; 98/2.05, 2.06, 2.07, 2.11

[56] References Cited

U.S. PATENT DOCUMENTS

| 2,295,750 | 9/1942 | Norris et al. .......................... 98/2.07 |
| 2,831,327 | 4/1958 | DeBeaubien et al. ........... 98/2.11 X |
| 4,007,875 | 2/1977 | Stolz et al. ...................... 237/12.3 A |
| 4,108,376 | 8/1978 | Matsuda et al. ............... 237/12.3 A |

FOREIGN PATENT DOCUMENTS 2614715  10/1977  Fed. Rep. of Germany ....... 98/2.06

Primary Examiner—Albert W. Davis, Jr.
Attorney, Agent, or Firm—David G. Alexander

[57] ABSTRACT

A heater (19) is disposed in an air flow duct (12) having an upper air outlet (22). An air filter (36) is disposed in a bypass duct (31) having an outlet (32) communicating with the upper outlet (22). Cool air flows into the bypass duct (31) from the air flow duct (12) upstream of the heater (19). Warm air is mixed with the cold air in the bypass duct (31) and is obtained either from the air flow duct (12) downstream of the heater (19) or is constituted by recirculated air from a vehicle passenger compartment.

5 Claims, 3 Drawing Figures

VEHICLE TEMPERATURE CONTROL APPARATUS

BACKGROUND OF THE INVENTION

The present invention relates to a temperature control apparatus for an automotive vehicle or the like.

In such an apparatus, a heater and a cooler are disposed in a main air flow duct and either outside air or recirculated air is caused to flow through the duct by a blower. A temperature control door proportions the amount of air flowing through the heater and cooler and thereby controls the temperature of air which is introduced into a vehicle passenger compartment through an upper outlet or a lower outlet.

It is desirable for hygienic reasons to clean the air before it is discharged into the passenger compartment. The obvious solution is to mount a filter in the air flow duct. However, commercially available filters and activated charcoal units create so much resistance to air flow that a sufficient amount of air flow for temperature control cannot be passed through the duct without the utilization of an excessively large blower. For this reason, a bypass duct is provided which has an outlet communicating with the upper outlet of the main duct and an inlet communicating with the main duct upstream of the heater. A filter unit comprising an air filter and activated charcoal unit is mounted in the bypass duct. In this way, sufficient air is filtered to considerably improve the hygienic conditions inside the passenger compartment and the filtered air is discharged through the upper air outet which is closest to the occupants' faces.

However, a problem has existed in such an apparatus when operated in the heating mode. The filtered air which is discharged through the upper outlet is too cold for occupant comfort, with the discomfort being especially felt since the cold air is blown against the occupants' faces.

SUMMARY OF THE INVENTION

A temperature control apparatus embodying the present invention includes main duct means having an upper outlet, heating means disposed in the main duct means, bypass duct means having an outlet which communicates with the upper outlet and air filter means disposed in the bypass duct means, and is characterized in that the bypass duct means comprises a warm air inlet.

In accordance with the present invention, a heater is disposed in an air flow duct having an upper air outlet. An air filter is disposed in a bypass duct having an outlet communicating with the upper outlet. Cool air flows into the bypass duct from the air flow duct upstream of the heater. Warm air is mixed with the cold air in the bypass duct and is obtained either from the air flow duct downstream of the heater or is constituted by recirculated air from a vehicle passenger compartment.

It is an object of the present invention to provide a vehicle temperature control apparatus featuring improved occupant comfort when operated in a heating mode.

It is another object of the present invention to provide a generally improved vehicle temperature control apparatus.

Other objects, together with the foregoing, are attained in the embodiments described in the following description and illustrated in the accompanying drawing.

DESCRIPTION OF THE PREFERRED EMBODIMENTS

While the vehicle temperature control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
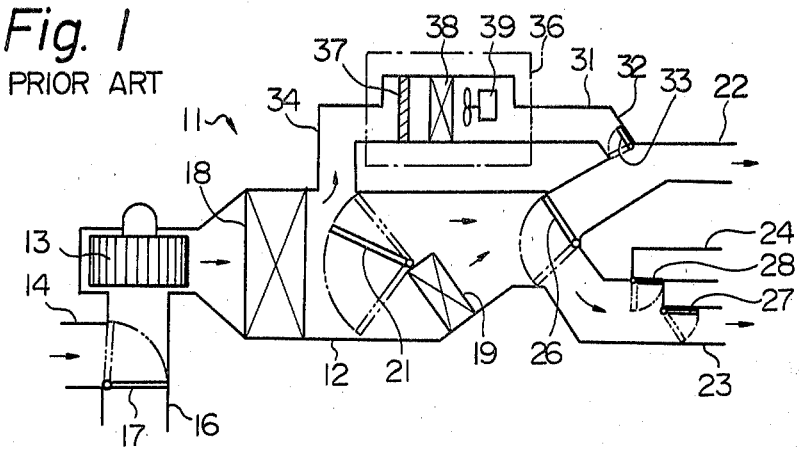
FIG. 1 is a schematic diagram of a prior art vehicle temperature control apparatus.

Referring now to FIG. 1 of the drawing, a prior art vehicle air temperature control apparatus is generally designated by the reference numeral 11 and comprises a main air flow duct 12. A blower 13 forces air through the duct 12 from left to right from either an outside air inlet 14 or a recirculated air inlet 16. A door 17 is provided to select one of the inlets 14 and 16.

An evaporator core 18 of a refrigerant or air conditioning system is disposed in the duct 12 for cooling the air passing therethrough. A heater core 19 is disposed in the duct 12 downstream of the evaporator core 18 for heating the air passing through the duct 12. A temperature control door 21 is provided to control the amount of air passing through the heater core 19 and thereby the temperature of the air passing through the duct 12. The temperature controlled air is discharged into a vehicle passenger compartment (not shown) through an upper air outlet 22, a lower air outlet 23 and a defroster outlet 24. A control door 26 selects the upper outlet 22 or the lower outlet 23 whereas a door 27 is operable to open or block the lower air outlet 23. A door 28 is operable to open or block the defroster outlet 24.

The apparatus 11 further comprises a bypass duct 31 having an outlet 32 which communicates with the upper outlet 22. A door 33 is provided to control air flow through the outlet 32. The bypass duct 31 further comprises an inlet 34 which communicates with the main duct 12 between the cores 18 and 19. Disposed in the duct 31 is an air filter unit 36 which comprises an air filter 37, an activated charcoal cannister 39 and a blower 39. A portion of the air from the duct 12 is forced through the duct 31 and filter unit 36 and cleaned to remove dirt and noxious odors. The cleaned air is discharged into the passenger compartment through the upper air outlet 22.

The drawback of the prior art apparatus 11 is that the cleaned air is cold and is discharged against the occupants' faces through the upper outlet 22, causing substantial discomfort when the apparatus 11 is operated in the heating mode. In the heating mode, the various doors are in the positions illustrated in solid line. The door 26 blocks the upper air outlet 22 so that warm air from the duct 12 is not mixed with cold cleaned air from the duct 31.

Figure 2:
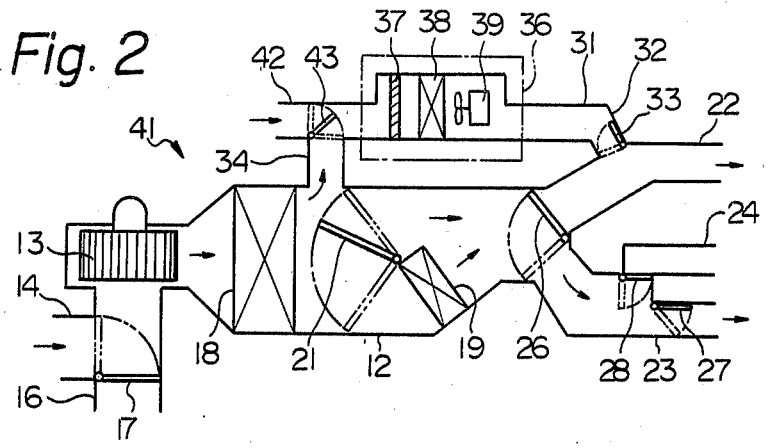
FIG. 2 is similar to FIG. 1 but illustrated a vehicle temperature control apparatus embodying the improvement of the present invention.

The drawback is overcome in accordance with the present invention which is illustrated in FIG. 2 and designated by the reference numeral 41. Like elements are designated by the same reference numerals utilized in FIG. 1.

The apparatus 41 is characterized by comprising a warm air inlet 42 provided to the duct 31 and a door 43 for controlling the proportion of air entering the duct 31 from the inlets 34 and 42. The inlet 42 communicates with the interior of the passenger compartment and is therefore a recirculated air inlet. The air inside the passenger compartment is at a comfortable warm temperature, and the cleaned air discharged into the passenger compartment from the duct 31 is therefore also warm and comfortable. It will be noted that the door 17 admits only outside air into the duct 12 in the heating mode. This is to provide adequate ventillation but ensures that the air entering the duct 12 will be cold. However, this problem is completely overcome in accordance with the present invention which substantially increases occupant comfort.

Figure 3:
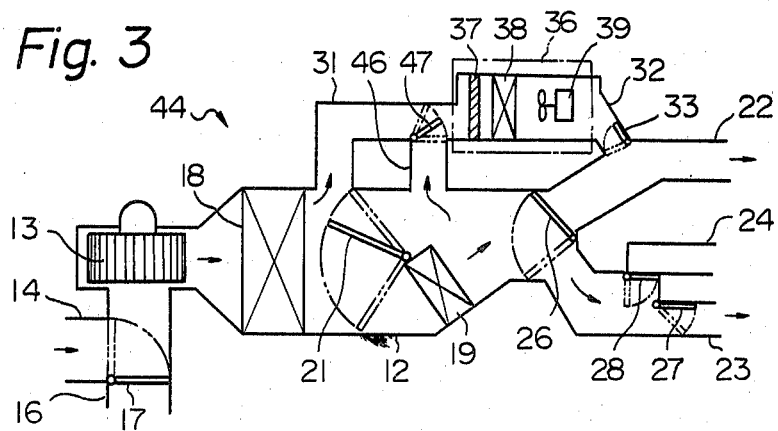
FIG. 3 is similar to FIG. 2 but illustrates another embodiment of the present invention.

Another embodiment of the present invention is shown in FIG. 3 and designated as 44. In the apparatus 44, the warm air is obtained from the duct 12 downstream of the heater core 19 through a warm air inlet 46. A control door 47 is provided in the inlet 46 to control the mixing proportion of cold and warm air. The effect is the same in that warm air is cleaned and deodorized and discharged into the passenger compartment through the duct 22.

In summary, it will be seen that the present invention overcomes the drawbacks of the prior art and provides a vehicle temperature control apparatus featuring substantially improved occupant comfort. Various modifications will become passible for those skilled in the art after receiving the teachings of the present disclosure without departing from the scope thereof.

What is claimed is:

1. A temperature control apparatus for an automotive vehicle including a main duct means having an upper outlet for introducing air into the upper part of the vehicle passenger compartment, heating means disposed in the main duct means, bypass duct means having an outlet which communicates with the upper outlet and air filter means disposed in the bypass duct means, characterized in that the bypass duct means comprises a warm air inlet;

the bypass duct means further comprising a cold air inlet which communicates with the main duct means upstream of the heating means.

2. An apparatus as in claim 1, in which the warm air inlet is a recirculated air inlet.

3. An apparatus as in claim 1, in which the warm air inlet communicates with the main duct means downstream of the heating means.

4. An apparatus as in claim 1, further comprising proportioning means for controlling a proportion of air entering the bypass duct means from the warm air inlet and the cold air inlet.

5. An apparatus as in claim 1, further comprising cooling means disposed in the main duct means upstream of the cold air inlet.

* * * * *